Dec. 2, 1958  J. R. PARSONS  2,862,695
APPARATUS FOR THE CONTINUOUS DIRECT DISPOSAL
OF VACUUM CLEANING WASTE MATERIAL
Filed March 8, 1954
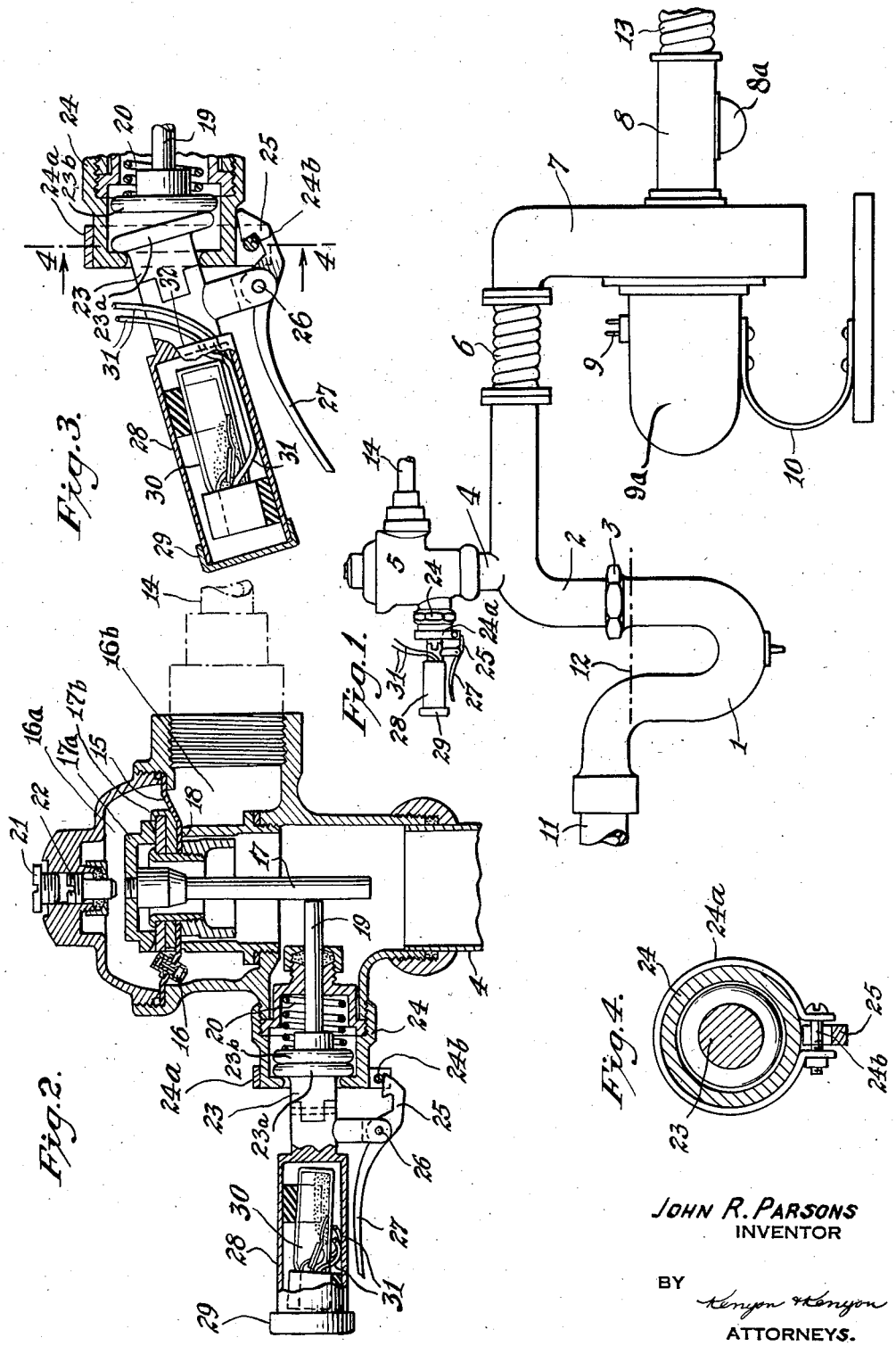
JOHN R. PARSONS
INVENTOR
BY
ATTORNEYS.

United States Patent Office 2,862,695
Patented Dec. 2, 1958

2,862,695

APPARATUS FOR THE CONTINUOUS DIRECT DISPOSAL OF VACUUM CLEANING WASTE MATERIAL

John R. Parsons, New York, N. Y.

Application March 8, 1954, Serial No. 414,747

4 Claims. (Cl. 261—30)

This is a continuation-in-part of my application Serial No. 273,098, filed February 23, 1952, now abandoned.

My invention relates to an apparatus for disposing of dust and other fine dirt particles from a device such as a vacuum cleaner directly into the ordinary sewage system by turbulently mixing said dust or dirt particles with water and forcing said mixture into the sewage system.

It is one object of my invention to violently mix the water and dust or dirt particles so that there is a complete wetting action of the dust and dirt particles collected from the operation of a device such as a vacuum cleaner, thus compacting and amassing the dust and dirt particles so that they may be easily carried away by the usual sewage system action and so that there are very few, if any, fine dust particles floating free in the gaseous area within the sewage system.

It is a further object of my invention to provide an apparatus which insures a continuous water trap between the sewage system and the cleaning apparatus. It is still a further object to provide an apparatus for disposing of dust particles which is very efficient because there is an unbroken and continuous mixing and disposal action and the back pressure from the point of disposal into the sewage system toward the air-suction mechanism is very slight.

Having thus described the general objects of my invention, I will now more particularly point out the particular features of my invention in the specification and accompanying drawings in which:

Figure 1 is a perspective view of the entire apparatus;

Figure 2 is a cross sectional view of the portion of my apparatus designated 5 in Figure 1;

Figure 3 is a cross-sectional view of the handle 28, shown in Figures 1 and 2, in its depressed position; and Figure 4 is a cross-sectional view taken on line 4—4 in Figure 3.

Referring to Figure 1, a flexible hose 13, which is connected to a source of dust particles such as vacuum cleaner sweepings, is connected through the pipe 8 to an air-suction mechanism 7. A dry sump 8a is attached to the connecting pipe 8 near the intake of the air-suction mechanism. The air-suction mechanism 7 is comprised of an ordinary impeller type vacuum cleaner which is rotated by an electric motor housed in housing 9a. This housing is mounted on a stationary surface, such as the floor, through the flexible spring 10 to aid in absorbing operating vibrations. Connected to the output of the air-suction mechanism 7 is a flexible hose 6 which is in turn connected to a pipe 2 which leads directly into and is connected to a U-shaped water and dust mixing chamber 1, which is in turn connected to an ordinary sewage waste system by means of a pipe 11. Connected to the pipe 2 between the air-suction mechanism output and the U-shaped mixing chamber is a water supply control means 5 for controlling the flow of water into the pipe 2, which will be explained in full hereinafter.

Referring to Figures 2 and 3 the operation of my apparatus will now be explained. It is desirous from a safety and a health standpoint that any dust particles which are placed directly in the sewage disposal system shall be completely and thoroughly wetted prior to such influx. This is accomplished in my invention by providing a flow of water through the U-shaped mixing chamber prior to, during and after the flow of dust particles through my apparatus. This is accomplished by a well-known valve system which opens quickly to allow the flow of water almost simultaneously with the turning "on" the mechanical control means but which gradually shuts off the water flow, through the action of the water pressure, after the mechanical control means has been turned "off."

In Figures 2 and 3 when the handle 28 is depressed, the arm 23 extending inwardly therefrom and the disc 23a attached to arm 23 are tilted, as shown in Fig. 3. A second disc 23b attached to a plunger 19 is displaced to the right against the helical spring 20 by this tilting of disc 23a and thus the plunger 19 is displaced to the right against the vertical lever 17. This displacement of the lever 17 operates a common flush valve in the following manner. The valve 17a rocks out of closed position and the water in chamber 16a flows downwardly into the pipe 4 connecting this valve mechanism to the pipe 2 and mixing chamber 1 in Figure 1. This flow of water out of the chamber 16a causes a pressure differential between this chamber and the chamber 16b which is connected to the ordinary water supply line by pipe 14. This pressure differential raises the flexible diaphragm 15, with its accompanying valve seating mechanism 17b, away from the valve seat 18 and allows a continual flow of water from the chamber 16b down through the pipe 4.

When the handle 28 is returned to its normal position, the above operation is not reversed mechanically and quickly but is reversed by the water pressure in the following manner. The valve 17a returns to its normally closed position due to the weight of the vertical rod 17 and the weight of the valve itself. Next the pressure differential between the chambers 16a and 16b is slowly but surely equalized by a flow of water upwardly through the restricted by-pass 16 and with this equalization the flexible valve 15 tends to gradually reseat itself thus closing off the direct supply of water from the chamber 16b. This time lag between the repositioning of the handle 28 to its normally shut off position and the cessation of the flow of water down through the connecting pipe 4 may be controlled by adjusting the opening in the by-pass 16.

The adjustable screw 22 protected by a cap 21, shown in Figure 2, may be adjusted to control the lift of the valve 17a which in turn controls the length of time necessary to produce a pressure differential between the chambers 16a and 16b which will lift the valve 15 and allow an influx of water down into the mixing chamber 1. As in the operation of the ordinary flush valve when the handle 28 thereof is depressed—assuming that there is some clearance between the end of the screw 22 and the top of valve 17a—the initial flow of water from chamber 16a into the mixing chamber will be instantaneous and the flow of water through valve 15 from the water source 14 will begin by the time this initial flow of water from chamber 16a stops. Thus with the depression of handle 28 there will be a substantially instantaneous flow of water into the mixing chamber, which flow will begin before the flow of air and dust particles from the air-suction mechanism 7 due to the fact that the depression of this handle also starts this mechanism which like all air moving devices requires a brief interval of time to start such air movement while it is accelerating to operating speed.

Referring to Figure 3, when the handle 28 is depressed an electrical switch, such as a mercury switch 30, completes a circuit through the wires 31, when properly connected to the air-suction mechanism at poles 9, energizing the air-suction mechanism. Thus when the handle 28 is depressed, the flow of water down through the pipe 4 into the pipe 2 and into the mixing chamber 1 is begun and shortly thereafter the flow of dust particles through the air-suction mechanism 7 into the pipe 2 and the mixing chamber 1 is begun. When the handle 28 is again returned to its normal shut off position the mercury switch 30 will break the circuit energizing the air-suction mechanism immediately, but as described above, the water will continue to flow for an adjustable period of time. As a practical matter an air-suction mechanism will continue to rotate and force dust particles through my apparatus for a few seconds after the air-suction mechanism is de-energized, but by adjusting the by-pass 16 in the valve 15 as described above, flow of water can be guaranteed after the air-suction mechanism action has died down.

The handle 28 is fastened in its depressed or "on" position and is held in this "on" position by any holding arrangement such as hook 25 hooked over pin 24b as shown in Figure 3. To turn the mechanism off the operator merely presses handle 27 up against the lever 28 and the spring 20 forces the handle 28 to its normal or "off" position.

It is particularly desirable and required by sanitary regulations in many areas that the water level in the gas trap or U-shaped mixing chamber 1 be constantly maintained at a level 12 so that there is no possibility of a seepage of dust particles or sewage gases back through this chamber into the apparatus and on into the atmosphere. This water level 12 is guaranteed by the slow action in closing "off" the water supply 14 by the above described slow acting valve mechanism.

It will be realized that with a fairly powerful air-suction mechanism, which at its output acts as a blower fan, and with the rush of water through the pipe 4 there will be a very turbulent mixing action in the U-shaped mixing chamber 1 and that each and every dust particle will be thoroughly wetted upon reaching the sewage disposal system through the pipe 11.

Because of the particular arrangement of elements as described above the air-suction mechanism sucks air through the pipe 8 and connecting hose 13 very efficiently as there is practically no back pressure on the air-suction mechanism exhaust. This low back pressure resulting in an efficient suction action is the result of the continuous and turbulent flow of air, dust and water through the mixing chamber without any sharp bends or sudden changes in direction of such flow.

The apparatus of my invention may be used to discharge wetted dust or dirt particles through the discharge pipe into systems or containers other than sewage systems and may further be used to discharge this mixture into an open air drainage basin. Such discharge may be accomplished by connecting a system or container other than a sewage system to the pipe 11 or by connecting a hose to this pipe which may be used to control the flow of mixture into an open basin. It will be realized that the maintenance of a continuous water level 12 in the U-shaped mixing chamber 1 is not as important from a gas trapping standpoint in the embodiments described in this paragraph but it is still important from the standpoint of guaranteeing a completly wetted discharge.

It will also be realized that the apparatus of my invention may be utilized to collect waste products which may be dried after their passage through my apparatus and used in the manufacture of by products. An example of this use of my apparatus is in collecting lint and fur particles in a fur processing plant which lint and fur when dried may be processed into felt. There are many other possibilities for utilizing my apparatus for the collecting of waste products which may be dried and thus recovered for further processing.

Having thus described my invention I claim:

1. A vacuum cleaner apparatus comprising an electrically motivated air-suction mechanism, an electric power line interconnecting said suction mechanism to an electric power source, a U-shaped water and dust mixing chamber, a conduit interconnecting one side of said mixing chamber to the outlet of said air-suction mechanism, a water source connected to said conduit intermediate said mixing chamber and air-suction mechanism, a disposal system connected to the other side of said mixing chamber, a flush valve disposed between said water source and said conduit adapted to open quickly to interconnect said water source and said conduit and adapted to close slowly to disconnect said water source and said conduit, a control handle connected to said flush valve, an electric switch connected in the electric power line and interconnected to said flush valve control handle so that the air-suction mechanism is switched on and switched off respectively, with the initial opening and closing movement of the control handle, whereby a flow of water from said water source is assured concurrently with the activation of the air-suction mechanism and a flow of water from said water source is assured for a period of time subsequent to the deactivation of the air-suction mechanism and during operation a flow of air and dust from the air-suction mechanism and a flow of water from the water source are passed simultaneously into the mixing chamber for a turbulent intermixture of the dust and water while in continuous flow into the disposal system.

2. A vacuum cleaner apparatus comprising an electrically motivated air-suction mechanism, an electric power line interconnecting said suction mechanism to an electric power source, a U-shaped water and dust mixing chamber, a conduit interconnecting one side of said mixing chamber to the outlet of said air-suction mechanism, a water source connected to said conduit intermediate said mixing chamber and air-suction mechanism, a disposal system connected to the other side of said mixing chamber, a flush valve disposed between said water source and said conduit adapted to open quickly to interconnect said water source and said conduit and adapted to close slowly to disconnect said water source and said conduit, a control handle connected to said flush valve, an electric switch connected in the electric power line and interconnected to said flush valve control handle so that the air-suction mechanism is switched on and switched off respectively, with the initial opening and closing movement of the control handle, whereby a flow of water from said water source is assured concurrently with the activation of the air-suction mechanism and a flow of water from said water source is assured for a sufficient period of time subsequent to the deactivation of the air-suction mechanism to maintain the U-shaped water and dust mixing chamber full of water when not in use, and during operation a flow of air and dust from the air-suction mechanism and a flow of water from the water source are passed simultaneously into the mixing chamber for a turbulent intermixture of the dust and water while in continuous flow into the disposal system.

3. A vacuum cleaner apparatus comprising an electrically motivated air-suction mechanism, an electric power line interconnecting said suction mechanism to an electric power source, a U-shaped water and dust mixing chamber, a conduit interconnecting one side of said mixing chamber to the outlet of said air-suction mechanism, a water source connected to said conduit intermediate said mixing chamber and air-suction mechanism, a disposal system connected to the other side of said mixing chamber, a flush valve disposed between said water source and said conduit adapted to open quickly to interconnect said water source and said conduit and adapted to close slowly to disconnect said water source and said conduit, a control mechanism adapted to initiate the opening and closing of the flush valve, an electric switch connected in the electric power line and interconnected to said flush valve control mechanism so that the air-suction mechanism is switched on and switched off when the valve control mechanism is initially moved to the valve opening and valve closing positions respectively, whereby a flow of water from said water source is assured concurrently with the activation of the air-suction mechanism and a flow of water from said water source is assured for a period of time subsequent to the deactivation of the air-suction mechanism and during operation a flow of air and dust from the air-suction mechanism and a flow of water from the water source are passed simultaneously into the mixing chamber for a turbulent intermixture of the dust and water while in continuous flow into the disposal system.

4. A vacuum cleaner apparatus comprising an electrically motivated air-suction mechanism, an electric power line interconnecting said suction mechanism to an electric power source, a U-shaped water and dust mixing chamber, a conduit interconnecting one side of said mixing chamber to the outlet of said air-suction mechanism, a water source connected to said conduit intermediate said mixing chamber and air-suction mechanism, a disposal system connected to the other side of said mixing chamber, a flush valve disposed between said water source and said conduit adapted to open quickly to interconnect said water source and said conduit and adapted to close slowly to disconnect said water source and said conduit, a control mechanism adapted to initiate the opening and closing of the flush valve, an electric switch connected in the electric power line and interconnected to said flush valve control handle so that the air-suction mechanism is switched on and switched off when the valve control mechanism is initially moved to the valve opening and valve closing positions respectively, whereby a flow of water from said water source is assured concurrently with the activation of the air-suction mechanism and a flow of water from said water source is assured for a sufficient period of time subsequent to the deactivation of the air-suction mechanism to maintain the U-shaped water and dust mixing chamber full of water when not in use, and during operation a flow of air and dust from the air-suction mechanism and a flow of water from the water source are passed simultaneously into the mixing chamber for a turbulent intermixture of the dust and water while in continuous flow into the disposal system.

References Cited in the file of this patent

UNITED STATES PATENTS

| | | |
|---|---|---|
| 1,103,995 | Murray | July 21, 1914 |
| 1,792,590 | Kirk | Feb. 17, 1931 |
| 1,939,949 | Bertram | Dec. 19, 1933 |
| 1,999,589 | Frey | Apr. 30, 1935 |
| 2,049,521 | Sloan | Aug. 4, 1936 |
| 2,207,576 | Brown | July 9, 1940 |
| 2,433,507 | Delany | Dec. 30, 1947 |
| 2,539,344 | Carraway | Jan. 23, 1951 |
| 2,583,252 | Carraway | Jan. 22, 1952 |
| 2,612,187 | Romanelli et al. | Sept. 30, 1952 |

FOREIGN PATENTS

| | | |
|---|---|---|
| 736,287 | France | Sept. 13, 1932 |